United States Patent Office 3,562,910
Patented Feb. 16, 1971

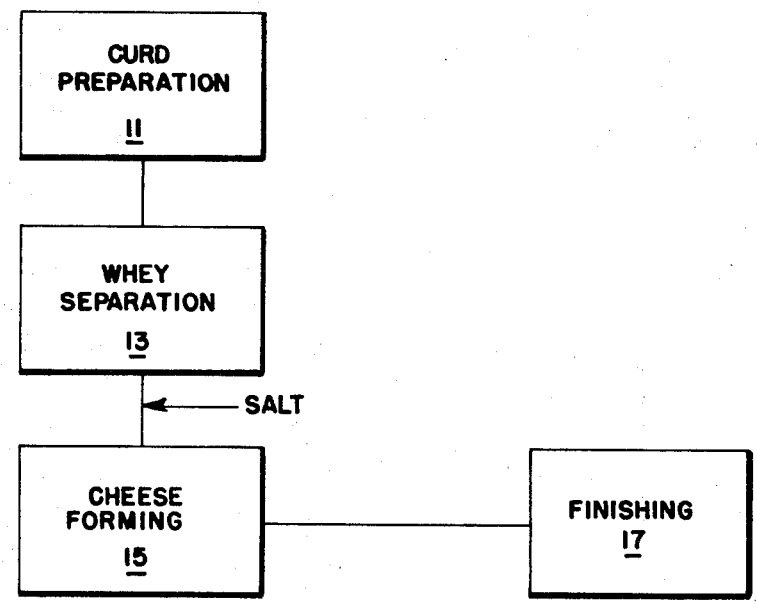
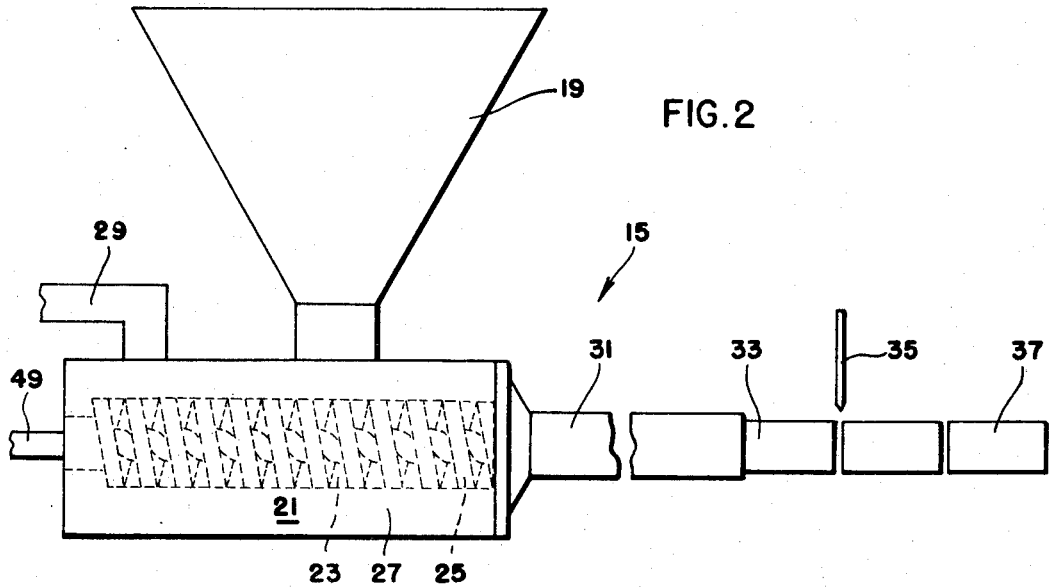

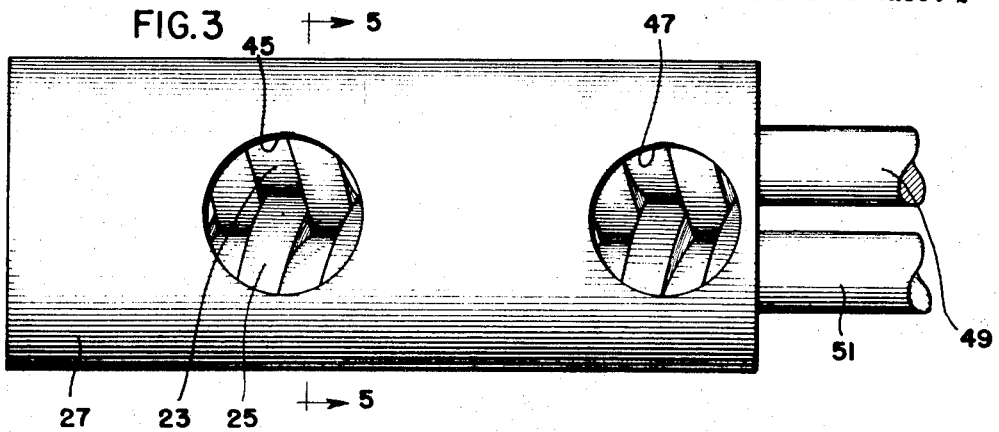
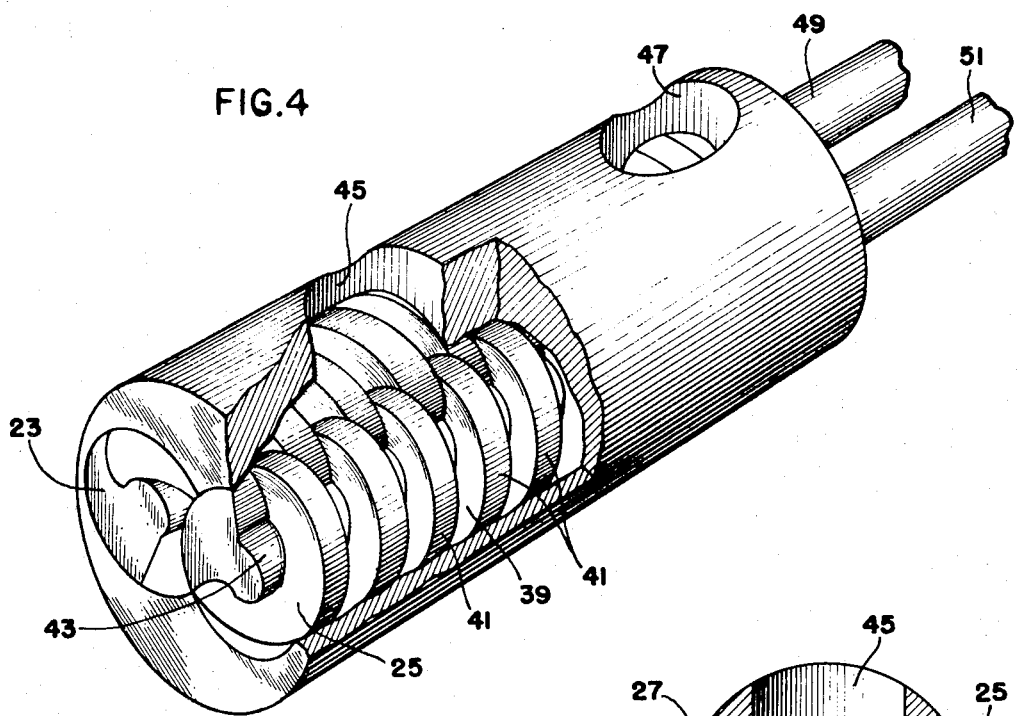
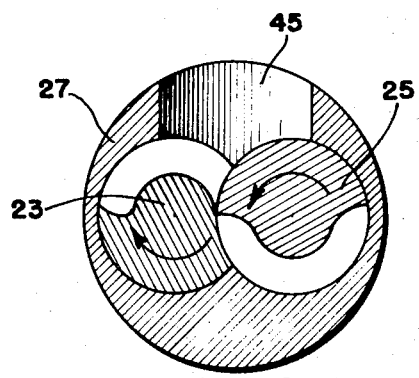

1

3,562,910
METHOD AND APPARATUS FOR
MAKING CHEESE
Heinz F. Runge, Niles, and Miron J. Roberts, Glenview,
Ill., assignors to Kraftco Corporation, a corporation of
Delaware
Filed Oct. 17, 1968, Ser. No. 768,391
Int. Cl. A01j 25/00
U.S. Cl. 31—89                                                    14 Claims

ABSTRACT OF THE DISCLOSURE

A method for the manufacture of cheese from cheese curd which is in particulate form. In the method, a cheese producing media such as cow's milk is treated in accordance with conventional procedures for the particular type of cheese to be produced so as to provide curd and whey. Thereafter the whey is drained from the curd until the level of moisture in the curd is that desired in the finished cheese product. The particulate curd is then transferred to apparatus wherein the curd is transferred and formed into a cohesive curd mass without damage to the curd particle. The mass is then cut into suitable-sized pieces and wrapped or otherwise packaged.

---

The present invention relates generally to a method for the manufacture of cheese, and more particularly, it relates to a method for the continuous manufacture of natural cheese from curd.

Cheeses are classified or characterized by differences in various characteristics. Thus, "natural" cheese is any cheese made directly from a naturally occurring media, such as cow's milk or sheep's milk. Another type of cheese is "process" cheese, which is made by grinding and mixing together with heating and stirring, one or more varieties of natural cheeses, together with added salts to provide a homogeneous, plastic mass.

Natural cheese may be "ripened" or "unripened." For the purpose of the present invention "ripened" cheese refers to any natural cheese which is cured or ripened during storage by either internal or external organisms, such as Cheddar cheese or brick cheese. "Unripened" cheese refers to any natural cheese which is made and used without undergoing ripening, as for example, cottage cheese or cream cheese.

The present invention is directed to an improved process for preparing ripened natural cheese, including, but not limited to, the following varieties of cheese: American, brick, Muenster, Parmesan, Gouda, blue-veined, Swiss and Edam. The method of the invention is particularly suitable for the production of American cheeses, such as Cheddar and Colby cheeses.

In general, most cheesemaking operations include the steps of providing a cheesemaking media, inoculating the media with an acid-producing microorganism, and forming a coagulum. The coagulum is cut to provide curd and whey, whereupon the curd is separated from the whey and subsequently, the whey is drained from the curd. The curd is pressed and then packed into a suitable form to provide a cohesive mass which, upon some ripening, becomes a cheese. Variations in one or more of the above steps for producing cheese result in production of the many varieties of cheese which are known.

The present invention is particularly directed to a system, apparatus and method for improvement in the method of handling a particular curd after whey has been separated therefrom so as to provide the curd in a desired form. The curd is thereafter cured in accordance with known procedures for the particular type of cheese to be produced.

2

Handling of curd after separation of whey has long been a problem for the cheese industry. Various methods have been devised for transferring, hooping, vacuum treating, pressing, cutting, grinding and otherwise handling the curd so as to facilitate the process of forming the curd into a cheese block or other finished cheese form. For example, United States Letters Patent Nos. 2,813,028 to Jackson and 3,401,041 to Nelson describe a method for packaging curd into a desired form by working curd into a container. The working is effected by forcing curd through an elongated cylindrical housing by means of an auger screw rotatably mounted in the housing. Such working in the apparatus is undesirable, however, in that it effects maceration of the curd and destroys curd identity. While the Jackson patent indicates that such treatment provides a shorter curing time, the damage to the curd is a disadvantage in providing an end product of desired quality.

Also, the prior art methods for handling cheese curd are not readily adapted to continuous manufacture of cheese from the curd. It would be desirable to provide cheese, which method is adaptable to continuous production of cheese.

The present invention is directed to providing an improved method for handling cheese curd to provide cheese of desired characteristics and quality, and which is adapted to continuous manufacture of cheese, and to providing a system and apparatus for effecting such method.

Accordingly, it is an object of the present invention to provide an improved method and apparatus for the manufacture of cheese. It is another object of the present invention to provide an improved method and apparatus for handling cheese curd without destroying curd identity. It is a still further object of the present invention to provide an improved method and apparatus for providing curd in the form of cheese which is adapted to continuous manufacture of cheese.

These and other objects of the invention will become more clear from a careful reading of the following detailed disclosure and from the acompanying drawings, wherein:

FIG. 1 is a flow diagram of a process showing various steps of the invention.

FIG. 2 is a schematic view of apparatus showing various of the features of the invention.

FIG. 3 is an enlarged top elevation view of portion of the apparatus of FIG. 2.

FIG. 4 is an enlarged perspective view, partially broken away, of a portion of the apparatus of FIG. 2; and FIG. 5 is a sectional view taken along the lines 5—5 of FIG. 2.

Generally, as shown in FIG. 1, the method of the invention relates to the manufacture of cheese from cheese curd which is in particulate form. A cheese-producing media, such as cow's milk, is provided for the process. In the curd preparation step designated by numeral 11, the media is treated in accordance with conventional procedures for the particular type of cheese to be produced, so as to provide curd and whey. Cooking of the curd may be adjusted to achieve the desired moisture level. The next step is whey separation shown at numeral 13, wherein the whey is drained from the curd until the level of moisture in the curd is that desired in the finished cheese product. Since later treatment steps do not permit or result in moisture separation, the make procedure must be adjusted top rovide curd at a desired and legal moisture level for the cheese which is to be produced.

If salt is required for the cheese, the salt is then added at the level desired in the finished cheese and is stirred into the curd. The particulate curd is then transferred to apparatus 15 wherein the curd is transferred and formed into a cohesive curd mass without damage to the curd particles. The mass is then cut into suitable-sized pieces and wrapped or otherwise packaged in a finishing step designated by numeral 17. The cheese pieces may then be treated in accordance with conventional procedures for the type of cheese being produced so as to cure the cheese and develop the desired flavor in the cheese.

The method of the invention may be adapted to the treatment of curd produced from any suitable media which provides curd. The method may be used for treating curd prepared from cow's milk, sheep's milk, goat's milk, soy milk, filled milk and imitation milk. The details of setting the cheese producing media to provide a coagulum, cutting the coagulum to provide curd and whey, stirring the curd and whey, cooking the curd, draining the whey from the curd, forming the curd into cheese and curing the cheese may be varied to produce characteristics and qualities distinctive to the particular kind of cheese to be produced but, as earlier pointed out, variation in make procedure will usually be necessary to provide the desired moisture in the finished product.

In performing the foregoing method, the apparatus 15 of the invention includes a hopper 19 for receiving the particulate cheese curd. The hopper 19 feeds into a curd transfer device 21 adjacent thereto. The curd transfer device 21 includes a pair of co-acting helical cams 23 and 25 and a close fitting housing 27 therefor. The housing 27 is provided with an outlet 29 by which vacuum may be established within the housing. The curd transfer device is of particular importance to this invention and must function to transfer the curd without particular damage to the particles. The device does not plow through the curd and the edges of the arms 23 and 25, in their operation, do not cut the particles as normally occurs with a screw conveyor. The curd transfer device 21 functions to carry the curd as distinguished from putting the curd under positive pressure and thereby minimizes damage to the curd. Any pressure developed in the curd transfer device is by way of back pressure at the outlet end and not by means of the helical cams. The distinction between the function and operation of the helical cams and the operational characteristics of a screw conveyor are to be particularly noted in connection with this invention.

A curd forming tube 31 is provided at the outlet end of the curd transfer device 21. The forming tube functions to provide a cohesive cheese mass 33 which is established within the curd forming tube 31. The curd at the outlet end of the curd transfer device 21 is in generally particulate form and cannot be cut or handled as a unit. As a result, means must be provided at the outlet end of the curd transfer device to form a cohesive mass which can be handled as a unit and which can be cut without fracturing of the mass into curd particles. Cutting apparatus 35 is provided at the end of the curd forming tube for cutting the cheese mass into cheese pieces 37 of a suitable size.

As previously indicated, the method of the invention may, in general, be used to produce any natural, ripened cheese. However, the method of the invention for preparing a cohesive cheese mass from particulate cheese curd may best be understood by reference to the manufacture of a particular type of cheese. Hereinafter, various of the features of invention will be described with particular reference to producing Colby cheese, a variety of American cheese. However, it should be understood that the scope of the invention is broader than the description of the manufacture of this particular cheese.

Colby cheese may be made by the method of the present invention from raw or pasteurized cow's milk. If pasteurized, the pasteurized milk is cooled to the setting temperature of about 88° F. and is transferred to a cheese vat, otherwise the milk is heated to this temperature. A starter culture is added, and the milk is stirred for about one hour as the milk develops acidity. Rennet is then mixed in thoroughly and stirring is stopped. After a coagulum is formed, usually about 30 minutes after adding of the rennet, the coagulum is cut with curd knives to provide curd and whey. The curd is stirred continuously in the whey from the time of cutting until the whey is drained from the curd. About 15 minutes after cutting is completed, the curd is cooked by heating gradually over a period of about 30 minutes to a temperature of about 100° F. The curd is held at that temperature for about one hour.

The whey is then drained from the curd and the curd is dry stirred for from about 30 to about 60 minutes. The curd is then washed by adding water which has been heated to a temperature of from about 90° F. to about 110° F. with continuous stirring. This differs from the usual make procedure for Colby cheese wherein the curd is washed with cool water at a temperature of about 60° F. Stirring is then continued for about 15 minutes and the curd is pushed to the sides of the vat and stirred enough to prevent matting of the curd as the wash water is drained from the curd. The wash water is drained and the curd is dry stirred until the moisture of the curd is at the level desired in the finished Colby cheese, i.e., usually about 15 minutes. Salt is then added to the curd at the level desired in the finished Colby cheese, i.e., about 1.6 percent. The make procedure varies from the usual make procedure of Colby cheese, in that the curd has the end moisture content of the cheese and no pressing or hooping of the curd is utilized. Furthermore, the subsequent processing in accordance with the invention does not apply sufficient pressure to the curd to cause it to exude moisture. The provision of a dry curd can be provided within the skill of the art for various types of cheese by adjusting various of the cheesemaking steps to provide such curd.

The curd, in the form of small pieces, is then transferred to the hopper 19 of the cheese forming apparatus 15. The curd drops from the bottom of the hopper 19 into pockets which are formed by the grooves in the cams 23 and 25 which are bounded by the housing 27, as will be explained in further detail hereinafter. Curd is transferred from the outlet of the hopper 19 in the curd transfer device 21 to the inlet of the forming tube 31 by means of the cams. The curd is deaerated by vacuum during its passage from the hopper to the forming tube in the curd transfer device. The deaeration is highly advantageous to obtain proper curd feeding and transfer.

As the curd is forced into the forming tube 31 resistance is established by friction between the curd and the walls of the tube. The resistance acts to compress the curd within the tube and form the curd into a cohesive cheese mass. In this connection the resistance is dependent upon the length of the tube but there must not be such great friction as to cause oiling off of the curd or undue heating along the tube surface. On the other hand, the friction should be sufficiently great to provide enough compression in the tube to effect a cohesive mass. Also contributing to the formation of the cohesive mass is knitting of the curd. Knitting is not merely a function of pressure but it is also a function of time. Accordingly, the curd must be maintained under pressure for sufficient time to provide the desired cohesive mass.

The tube temperature and characteristics may be controlled along its length to provide desired handling of the curd in the forming tube 31. This will be more fully described hereinafter. It should be further noted that different cheeses have different body characteristics with some cheeses being considerably more open textured than other cheeses.

For the manufacture of three inch diameter rounds of Colby cheese, a smooth, stainless steel forming tube having a length of from about 20 feet to about 30 feet has been found suitable to effect both sufficient compression of the curd to form a cheese mass and maintain the compression for a sufficient time to effect knitting. Other types of cheese, with different textures, will require different lengths of tube. The length of tube required is easily determined by one skilled in the art.

In this connection, sufficient resistance to effect compression of the curd into a cheese mass may be established within a relatively short length of forming tube of from about 5 to about 20 feet in length. This relatively short length of forming tube may, however, be insufficient to maintain the compression for a time sufficient to establish knitting during continuous forming. However, a plurality of such relatively short forming tubes may be used in the method of the invention if discontinuous forming is used. Thus, curd is transferred into tubes until the forming tube is full. The first forming tube is then disconnected from the curd transfer device and a second forming tube is connected to the curd transfer device and filled. The second forming tube is then disconnected and the first forming tube reconnected. Curd is then transferred to the first forming tube until the originally filled curd is ejected from the first forming tube and cut into suitable size pieces by the cutting apparatus. A third, fourth, fifth, etc. forming tube may be used to increase the time the curd is under compression in each forming tube before being ejected if necessary to establish knitting. Switching of the output from the curd transfer device may be accomplished by suitable automatic means.

The effective resistance provided by a given length of tube may be altered by changing the tube material or by heating or cooling the tube. Heating of the tube to a temperature sufficient to melt the fat of the cheese curd causes oiling off which effects lubrication of the walls of the tube and lowers the effective resistance of the tube. However, undue oiling off is undesirable and the temperature of the tube surface adjacent the cheese should not exceed about 160° F. Cooling the tube increases the effective resistance. Heating and cooling along the forming tube length may be used to provide a variety of cheese types from a tube of given length.

The curd transfer device 21 for moving the curd particles from the hopper 19 to the forming tube 31 is best seen in FIGS. 3 and 4. The device comprises cams 23 and 25 and housing 27. A feeding port 45 is located in the housing for receiving the curd from the hopper to the cams. A further opening 47 is located in the housing. The opening 47 is used to communicate with a vacuum source and thereby establish vacuum within the housing whereby the curd is deaerated. The pair of cams 23 and 25 have spiral grooves 39 and lands 41, each of which is generally rectangular in cross-section. The lands and grooves of each cam as shown in the drawings are generally square cut, and are machined to mate with the corresponding lands and grooves of the other cam.

In operation, the interlocking nature of the pair of cams works in effect to establish a series of continuously forwardly moving pockets which accept cheese curd from the hopper 19 and deliver the curd to the entrance of the forming tube 31. Thus, the curd is not pushed or particularly squeezed in its movement through the curd transfer device. The pocket walls are bounded by the sides of two successive lands 41. The bottom of the pocket is established by the cam shaft 43 and the top of the pocket is established by the housing 27. The pocket is also bounded by the face of the lands of the other cam.

The cams are driven by motor means (not shown) which is connected to the shafts 49 and 51. As the cams are turned in the directions indicated in FIG. 5, each pocket is continuously defined by different portions of the lands and grooves of cams 23 and 25 and housing 37. The appearance from the feed port 45 is of a series of continuously forwardly moving pockets and the curd particles move in the pockets but are not caught between the grooves and lands of the respective cams.

Curd is deposited in a pocket as it moves beneath the feeding port 45 located beneath the hopper 19. The pocket is generally C-shaped and may not be packed full of curd. As the pocket moves forward from beneath the feeding port 45, the curd within the pocket is isolated from curd within other pockets and will not be crushed, mashed or broken. Curd identity is retained until forming of the curd into a cheese mass is effected in the forming tube 31.

This handling of curd by the curd transfer device 21 is to be distinguished from prior art single screw auger feeding systems. With a single screw auger the flights of the auger cut through the curd and move the curd by pressure. Such action compresses and cuts the curd, destroying curd identity. A single screw auger has not been found suitable for the practice of the present invention.

As previously indicated the curd is deaerated before being compressed within the forming tube to form a cheese mass. Reaeration is considered an important step in the method of the invention. Deaeration in the method of the invention facilitates feeding of curd to the curd transfer device and also serves to remove air from between the curd particles, thereby permitting the desired level of compaction to be established in the forming tube. As shown in FIG. 2, deaeration may be effected by connecting the housing 27 to a vacuum source (not shown) by means of pipe 29, located rearwardly of the feed hopper 19. Thus, the vacuum is established within the housing 27 with curd. This vacuum is particularly advantageous for achieving proper filling of the pockets with curd, although it also functions to deaerate the curd. Generally a vacuum of greater than about 15 inches of Hg is sufficient to effect deaeration of the curd. However, a vacuum of greater than about 20 inches of Hg is sometimes required for achieving proper filling of the pockets.

The cheese forming step of the method of the invention has been defined with respect to particular apparatus, i.e., the forming tube 31. It should be understood, however, that other means may be used to effect formation of the curd into cheese. For example, the curd exiting from the curd transfer apparatus 15 may be packed into suitable containers applied to the outlet of the curd transfer device. To effect suitable compression of the curd a back pressure of at least about 20 p.s.i.g. must be established as the curd is packed into the containers. Preferred containers for this embodiment are plastic tubes which may be closed at suitable intervals. The curd in the plastic tubes may then be held for any suitable time sufficient to establish a cohesive cheese mass by knitting. The cohesive cheese mass within the tube may then be cut at suitable intervals and wrapped to provide sizes suitable for consumer use.

The above described embodiment of the invention is suitable for continuous curd handling, and a considerable saving is effected over prior art methods for making cheese. For example, small round loaves of American cheese are referred to in the cheese trade as "Midget Longhorns." Midget Longhorn cheese is conventionally prepared by cutting small cylinders from large rectangular blocks of cheese. Such cutting results in considerable scrap which is avoided in the practice of this invention. Obviously, the invention is particularly applicable to any cheese of round configuration, but it will be appreciated that other configurations can be provided.

The various features of the invention which are believed to be new are set forth in the following claims.

What is claimed is:

1. A method for making natural type cheese comprising providing curd particles, establishing the moisture level of finished cheese in said curd particles, providing said curd particles having said moisture level for transfer, transferring units of said curd particles without substantial pressure and with minimum damage to the curd particles, deaerating said curd particles during said transfer and thereafter forming a cohesive cheese mass by establishing pressure on said curd particles for a predetermined time.

2. A method in accordance with claim 1 wherein said cohesive cheese mass is continuously formed.

3. A method in accordance with claim 1 wherein said cohesive cheese mass is cut into desired sizes and packaged.

4. A method in accordance with claim 1 wherein said curd is formed into a cohesive cheese mass by transferring said units of curd to a forming tube, said forming tube having a length sufficient to establish frictional resistance on said curd sufficient to compress said curd for a time sufficient for said curd to knit into a cohesive cheese mass.

5. A method in accordance with claim 1 wherein said curd is formed into a cohesive cheese mass by transferring said units of curd to a container and establishing a back pressure in said container.

6. A method in accordance with claim 5 wherein said back pressure is at least about 20 p.s.i.g.

7. Apparatus for forming cheese curd into a cohesive cheese mass to be made into natural type cheese, comprising means for holding cheese curd particles having the moisture level of finished cheese, means for forming said cheese curd particles into a cohesive cheese mass of desired shape, transfer means providing a series of separate, continuously forwardly moving pockets for accepting units of curd particles from said holding means and for transferring said units of cheese curd particles to said forming means and vacuum means for establishing a vacuum within said transfer means.

8. Apparatus in accordance with claim 7 wherein said forming means comprise at least one tube of uniform cross section, said tube being open at the end outermost from said transfer means so as to permit said cheese curd to pass therethrough and said tube being of sufficient length to cause compression of said curd for sufficient time during said passage to knit said curd into a cohesive cheese mass.

9. Apparatus in accordance with claim 8 wherein said transfer means comprise a pair of intermeshing helical cams.

10. Apparatus in accordance with claim 7 wherein said forming means comprise a closed container.

11. Apparatus in accordance with claim 10 wherein said container is adapted to cause a back pressure of at least about 20 p.s.i.g. to be established during filling of said container by said transfer means.

12. Apparatus in accordance with claim 8 which further includes means for cutting said cohesive cheese mass into desired size pieces.

13. Apparatus in accordance with claim 7 wherein said forming means comprises a container and means for establishing back pressure in said container.

14. Apparatus in accordance with claim 13 wherein said back pressure means provides a back pressure means of about 20 p.s.i.g.

References Cited

UNITED STATES PATENTS

| | | | |
|---|---|---|---|
| 1,403,673 | 1/1922 | Doering | 31—14 |
| 1,492,388 | 4/1924 | Popper | 99—115 |
| 2,009,238 | 7/1935 | Parsons | 99—115 |
| 2,019,002 | 10/1935 | Drohmann et al. | 31—14 |
| 2,039,162 | 4/1936 | Gerstenberg | 31—35 |
| 2,263,851 | 11/1941 | O'Connell et al. | 31—89X |
| 2,481,689 | 9/1949 | Schaub | 31—14X |

FOREIGN PATENTS

| | | |
|---|---|---|
| 1,153,231 | 8/1963 | Germany. |

HUGH R. CHAMBLEE, Primary Examiner

U.S. Cl. X.R.

31—46

UNITED STATES PATENT OFFICE
CERTIFICATE OF CORRECTION

Patent No. 3,562,910           Dated February 16, 1971

Inventor(s) Heinz F. Runge and Miron J. Roberts

It is certified that error appears in the above-identified patent and that said Letters Patent are hereby corrected as shown below:

Column 1, line 62, "cohesive" is misspelled;
Column 2, line 21, at the end of the line insert "an improved method for handling curd to provide';
Column 2, line 67, "top rovide" is shown instead of "to provide";
Column 5, line 69, change "37 to "27";
Column 6, line 16, "deaeration" is misspelled.

Signed and sealed this 13th day of July 1971.

(SEAL)
Attest:

EDWARD M. FLETCHER, JR.            WILLIAM E. SCHUYLER
Attesting Officer                  Commissioner of Pat